(12) United States Patent
Wang et al.

(10) Patent No.: US 6,603,329 B1
(45) Date of Patent: Aug. 5, 2003

(54) SYSTEMS AND METHODS FOR ON-CHIP IMPEDANCE TERMINATION

(75) Inventors: Xiaobao Wang, Santa Clara, CA (US); Chiakang Sung, Milpitas, CA (US); Bonnie I. Wang, Cupertino, CA (US); Khai Nguyen, San Jose, CA (US)

(73) Assignee: Altera Corporation, San Jose, CA (US)

( * ) Notice: Subject to any disclaimer, the term of this patent is extended or adjusted under 35 U.S.C. 154(b) by 0 days.

(21) Appl. No.: 10/044,459

(22) Filed: Jan. 11, 2002

Related U.S. Application Data

(60) Provisional application No. 60/315,875, filed on Aug. 29, 2001.

(51) Int. Cl.[7] .............................................. H03K 17/16
(52) U.S. Cl. .............................. 326/30; 326/83; 326/86; 327/108; 327/404; 327/308
(58) Field of Search .............................. 326/30, 83, 86, 326/90; 327/108, 308–310, 404

(56) References Cited

U.S. PATENT DOCUMENTS

| | | | |
|---|---|---|---|
| 5,164,663 A | | 11/1992 | Alcorn |
| 5,359,235 A | | 10/1994 | Coyle et al. |
| 5,374,861 A | | 12/1994 | Kubista |
| 5,592,510 A | * | 1/1997 | Van Brunt et al. ........... 375/220 |
| 5,726,582 A | * | 3/1998 | Hedberg ...................... 326/30 |
| 5,726,583 A | | 3/1998 | Kaplinsky |
| 5,764,080 A | | 6/1998 | Huang et al. |
| 5,864,715 A | | 1/1999 | Zani et al. |
| 5,939,896 A | * | 8/1999 | Hedberg ...................... 326/30 |
| 5,955,911 A | | 9/1999 | Drost et al. |
| 5,970,255 A | | 10/1999 | Tran et al. |
| 6,008,665 A | | 12/1999 | Kalb et al. |

(List continued on next page.)

OTHER PUBLICATIONS

Altera, Apex 20K "Programmable Logic Device Family," Altera Corporation, Ver. 1.1, May 2001.
Altera, Apex II "Programmable Logic Device Family," Altera Corporation, Ver. 1.1, May 2001.
Esch and Manley, Theory and Design of CMOS HSTL I/O Pads, The Hewlett Packard Journal, Aug. 1998.
Xilinx, "Virtex–II 1.5V Field Programmable Gate Arrays," Xilinx, DSO3102 (v1.5), Apr. 2, 2001.
Bendak, M. et al. (1996). "CMOS VLSI Implementation of Gigabyte/second computer network links," Dept. of Electrical and Computer Engineering, University of California at San Diego, La Jolla, CA 92093–0407, *IEEE International Symposium on Circuits and Systems* pp. 269–272.
Boni, A. et al. (2001). "LVDS I/O Interface for Gb/s–per–Pin Operation in 0.35–um CMOS," IEEE Journal of Solid––State Circuits, 36(4):706–711.

*Primary Examiner*—Michael Tokar
*Assistant Examiner*—Vibol Tan
(74) *Attorney, Agent, or Firm*—Townsend and Townsend and Crew LLP; Steven J. Cahill

(57) ABSTRACT

Techniques for on-chip impedance termination are provided that substantially reduce the number of external resistors that are need to provide impedance termination at a plurality of pairs of differential input/output (I/O) pins. On-chip impedance termination circuits of the present invention may include an amplifier, a feedback loop, and an impedance termination circuit. A reference voltage is provided to a first input terminal of the amplifier. A feedback loop is coupled between an output terminal of the amplifier and a second input terminal of the amplifier. The amplifier drives its output voltage so that the voltage at the second input terminal matches the voltage at the first input terminal. The output voltage of the amplifier determines the resistance of the impedance termination circuit. The impedance termination circuit is coupled between differential I/O pins.

21 Claims, 7 Drawing Sheets

U.S. PATENT DOCUMENTS

| | | |
|---|---|---|
| 6,026,456 A | 2/2000 | Ilkbahar |
| 6,037,798 A | 3/2000 | Hedberg |
| 6,049,255 A | 4/2000 | Hagberg et al. |
| 6,064,224 A | 5/2000 | Esch, Jr. et al. |
| 6,087,847 A | 7/2000 | Mooney et al. |
| 6,100,713 A | 8/2000 | Kalb et al. |
| 6,147,520 A | 11/2000 | Kothandaraman et al. |
| 6,157,206 A | 12/2000 | Taylor et al. |
| 6,236,231 B1 | 5/2001 | Nguyen et al. |
| 6,252,419 B1 | 6/2001 | Sung et al. |
| 6,329,836 B1 | 12/2001 | Drost et al. |
| 6,362,644 B1 | 3/2002 | Jeffery et al. |
| 6,424,169 B1 * | 7/2002 | Partow et al. ................ 326/30 |

* cited by examiner

SYSTEMS AND METHODS FOR ON-CHIP IMPEDANCE TERMINATION

CROSS-REFERENCES TO RELATED APPLICATIONS

This Application claims the benefit of U.S. Provisional Patent Application No. 60/315,875, filed Aug. 29, 2001, which is hereby incorporated by reference herein.

BACKGROUND OF THE INVENTION

The present invention relates to techniques for on-chip impedance termination, and more particularly, to on-chip impedance termination at differential input/output pins that saves board space.

Prior art integrated circuits have included a high speed input/output (I/O) standard known as the low voltage differential signal (LVDS) standard. The LVDS standard refers to a method for inputting and outputting differential signals across I/O pins of an integrated circuit. A differential input signal is typically applied across two LVDS pins of an integrated circuit and to a buffer circuit that drives the input signal to circuitry within the integrated circuit. The LVDS standard is well-known in the art.

An input voltage signal applied to differential LVDS I/O pins varies by a AC (alternating current) value. The buffer circuit outputs a voltage signal indicative of a logic HIGH or a logic LOW in response to the voltage of the input signal across the LVDS I/O pins.

An external resistor is coupled between each pair of LVDS pins off-chip to provide impedance termination and voltage swing for the differential input signals applied to the LVDS pins. The impedance termination resistor reduces reflection of input signals on differential signal lines coupled to the LVDS pins. Coupling an external resistor to each pair of LVDS pins on an integrated circuit may use a substantial amount of board space. Therefore, it would be desirable to provide a technique for providing impedance termination for differential I/O pins in an integrated circuit that does not occupy as much board space.

BRIEF SUMMARY OF THE INVENTION

Techniques for on-chip impedance termination are provided that substantially reduce the number of external resistors that are needed to provide impedance termination at a plurality of pairs of differential input/output (I/O) pins. On-chip impedance termination circuits of the present invention may include an amplifier, a feedback loop, and an impedance termination circuit. A reference voltage is provided to a first input terminal of the amplifier. A feedback loop is coupled between an output terminal of the amplifier and a second input terminal of the amplifier. The amplifier drives its output voltage so that the voltage at the second input terminal matches the voltage at the first input terminal.

The output voltage of the amplifier determines the resistance of the impedance termination circuit. The impedance termination circuit is coupled between differential I/O pins. The amplifier may be coupled to impedance termination circuits for numerous pairs of differential I/O pins on an integrated circuit.

DETAILED DESCRIPTION OF THE INVENTION

Figure 1:
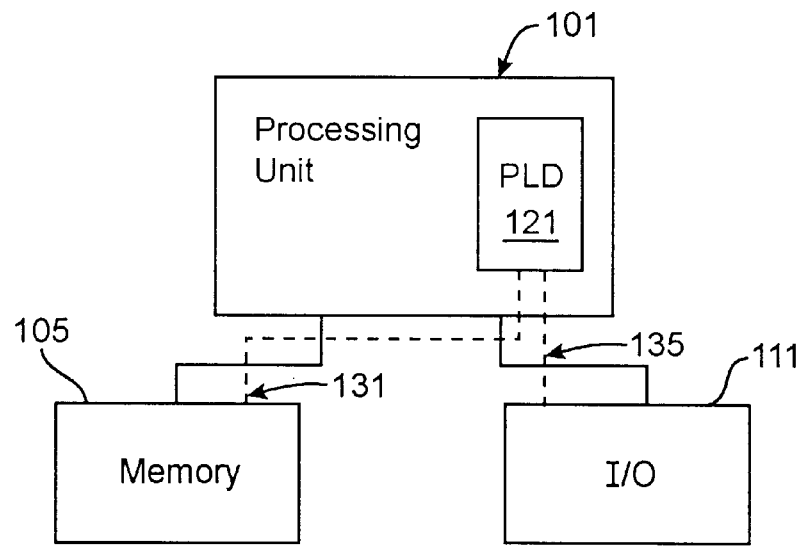
FIG. 1 is diagram of a digital system with a programmable logic integrated circuit.

FIG. 1 shows a block diagram of a system within which the present invention may be embodied. The system may be provided on a single board, on multiple boards, or even within multiple enclosures. FIG. 1 illustrates a system 101 in which a programmable logic device 121 may be utilized. Programmable logic devices are sometimes referred to as a PALs, PLAs, FPLAs, PLDs, CPLDs, EPLDs, EEPLDs, LCAs, or FPGAs and are well-known integrated circuits that provide the advantages of fixed integrated circuits with the flexibility of custom integrated circuits. Such devices allow a user to electrically program standard, off-the-shelf logic elements to meet a user's specific needs. Programmable logic devices are currently represented by, for example, Altera's MAX®, FLEX®, and APEX™ series of PLDs. Programmable logic integrated circuits and their operation are well known to those of skill in the art.

In the particular embodiment of FIG. 1, a processing unit 101 is coupled to a memory 105 and an I/O 111 and incorporates a programmable logic device (PLD) 121. PLD 121 may be specially coupled to memory 105 through connection 131 and to I/O 111 through connection 135. The system may be a programmed digital computer system, digital signal processing system, specialized digital switching network, or other processing system. Moreover, such systems may be designed for a wide variety of applications such as, merely by way of example, telecommunications systems, automotive systems, control systems, consumer electronics, personal computers, and others.

Processing unit 101 may direct data to an appropriate system component for processing or storage, execute a program stored in memory 105 or input using I/O 111, or other similar function. Processing unit 101 may be a central processing unit (CPU), microprocessor, floating point coprocessor, graphics coprocessor, hardware controller, microcontroller, programmable logic device programmed for use as a controller, or other processing unit. Furthermore, in many embodiments, there is often no need for a CPU. For example, instead of a CPU, one or more PLDs 121 may control the logical operations of the system. In some embodiments, processing unit 101 may even be a computer system. Memory 105 may be a random access memory (RAM), read only memory (ROM), fixed or flexible disk media, PC Card flash disk memory, tape, or any other storage retrieval means, or any combination of these storage retrieval means. PLD 121 may serve many different purposes within the system in FIG. 1. PLD 121 may be a logical building block of processing unit 101, supporting its internal and external operations. PLD 121 is programmed to implement the logical functions necessary to carry on its particular role in system operation.

Figure 2:
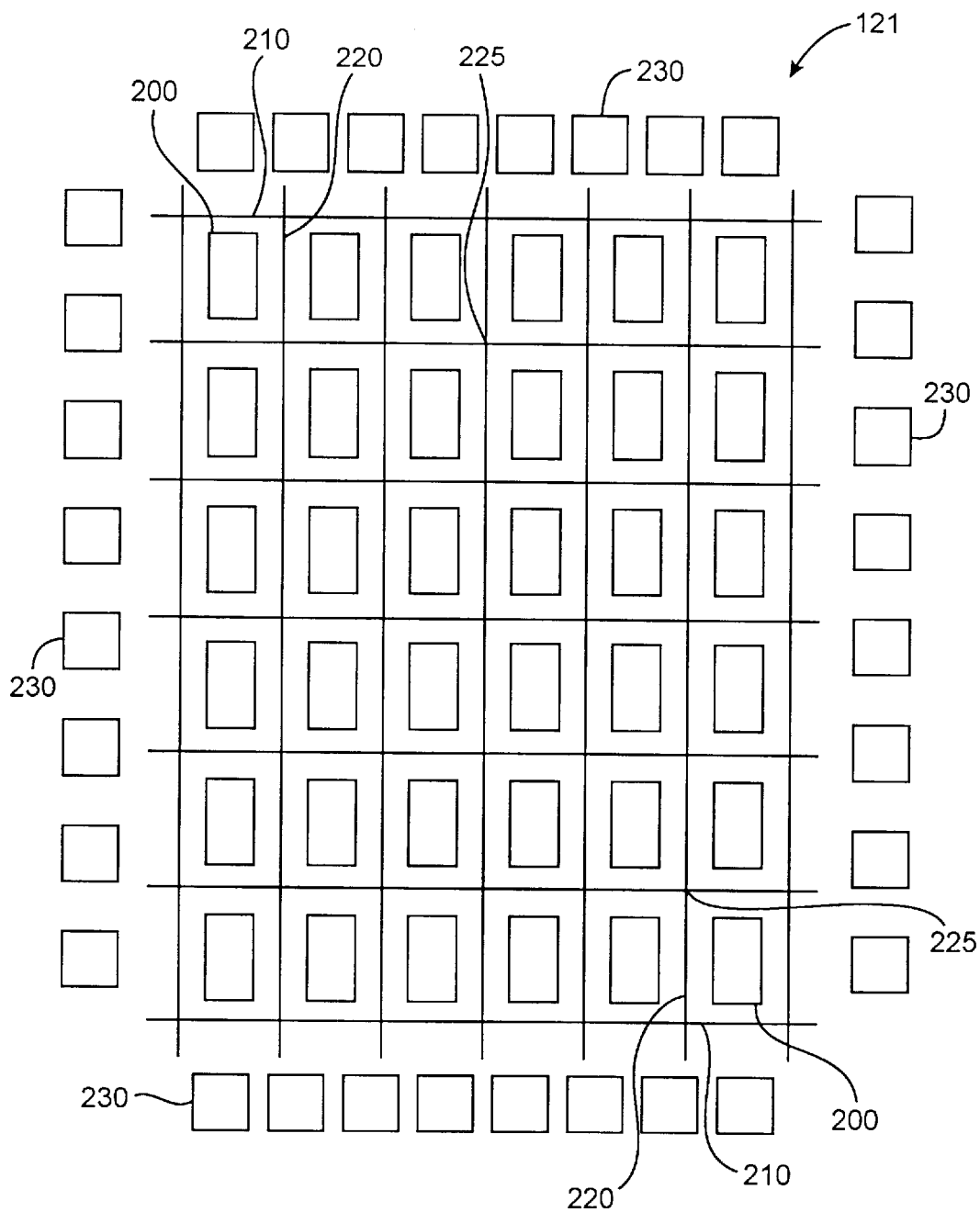
FIG. 2 is a diagram showing an architecture of a programmable logic integrated circuit.

FIG. 2 is a simplified block diagram of an overall internal architecture and organization of PLD 121 of FIG. 1. Many details of PLD architecture, organization, and circuit design are not necessary for an understanding of the present invention and such details are not shown in FIG. 2.

FIG. 2 shows a six-by-six two-dimensional array of thirty-six logic array blocks (LABs) 200. LAB 200 is a physically grouped set of logical resources that is configured or programmed to perform logical functions. The internal architecture of a LAB will be described in more detail below in connection with FIG. 3. PLDs may contain any arbitrary number of LABs, more or less than shown in PLD 121 of FIG. 2. Generally, in the future, as technology advances and improves, programmable logic devices with greater numbers of logic array blocks will undoubtedly be created. Furthermore, LABs 200 need not be organized in a square matrix or array; for example, the array may be organized in a five-by-seven or a twenty-by-seventy matrix of LABs.

LAB 200 has inputs and outputs (not shown) which may or may not be programmably connected to a global interconnect structure, comprising an array of global horizontal interconnects (GHs) 210 and global vertical interconnects (GVs) 220. Although shown as single lines in FIG. 2, each GH 210 and GV 220 line may represent a plurality of signal conductors. The inputs and outputs of LAB 200 are programmably connectable to an adjacent GH 210 and an adjacent GV 220. Utilizing GH 210 and GV 220 interconnects, multiple LABs 200 may be connected and combined to implement larger, more complex logic functions than can be realized using a single LAB 200.

In one embodiment, GH 210 and GV 220 conductors may or may not be programmably connectable at intersections 225 of these conductors. Moreover, GH 210 and GV 220 conductors may make multiple connections to other GH 210 and GV 220 conductors. Various GH 210 and GV 220 conductors may be programmably connected together to create a signal path from a LAB 200 at one location on PLD 121 to another. LAB 200 at another location on PLD 121. A signal may pass through a plurality of intersections 225. Furthermore, an output signal from one LAB 200 can be directed into the inputs of one or more LABs 200. Also, using the global interconnect, signals from a LAB 200 can be fed back into the same LAB 200. In specific embodiments of the present invention, only selected GH 210 conductors are programmably connectable to a selection of GV 220 conductors. Furthermore, in still further embodiments, GH 210 and GV 220 conductors may be specifically used for passing signal in a specific direction, such as input or output, but not both.

In other embodiments, the programmable logic integrated circuit may include special or segmented interconnect that is connected to a specific number of LABs and not necessarily an entire row or column of LABs. For example, the segmented interconnect may programmably connect two, three, four, five, or more LABs.

The PLD architecture in FIG. 2 further shows at the peripheries of the chip, input-output drivers 230. Input-output drivers 230 are for interfacing the PLD to external, off-chip circuitry. FIG. 2 shows thirty-two input-output drivers 230; however, a PLD may contain any number of input-output drivers, more or less than the number depicted. Each input-output driver 230 is configurable for use as an input driver, output driver, or bidirectional driver. In other embodiments of a programmable logic integrated circuit, the input-output drivers may be embedded with the integrated circuit core itself. This embedded placement of the input-output drivers may be used with flip chip packaging and will minimize the parasitics of routing the signals to input-output drivers.

Figure 3:
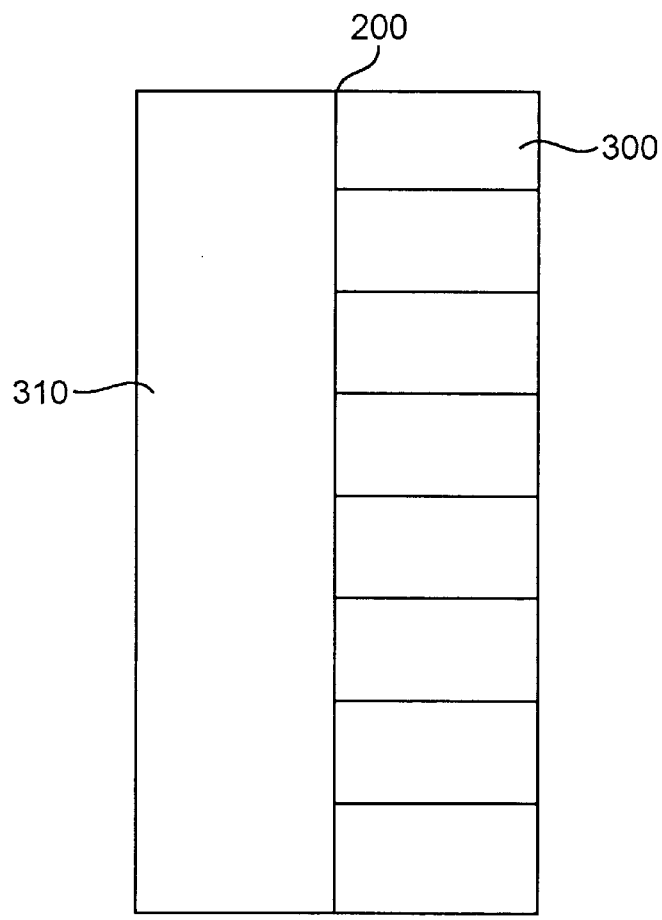
FIG. 3 is a simplified block diagram of a logic array block (LAB)

FIG. 3 shows a simplified block diagram of LAB 200 of FIG. 2. LAB 200 is comprised of a varying number of logic elements (LEs) 300, sometimes referred to as "logic cells," and a local (or internal) interconnect structure 310. LAB 200 has eight LEs 300, but LAB 200 may have any number of LEs, more or less than eight.

A general overview of LE 300 is presented here. LE 300 is the smallest logical building block of a PLD. Signals external to the LAB, such as from GHs 210 and GVs 220, are programmably connected to LE 300 through local interconnect structure 310. In one embodiment, LE 300 incorporates a function generator that is configurable to provide a logical function of a number of variables, such a four-variable Boolean operation. As well as combinatorial functions, LE 300 also provides support for sequential and registered functions using, for example, D flip-flops.

LE 300 provides combinatorial and registered outputs that are connectable to the GHs 210 and GVs 220, outside LAB 200. Furthermore, the outputs from LE 300 may be internally fed back into local interconnect structure 310; through local interconnect structure 310, an output from one LE 300 may be programmably connected to the inputs of other LEs 300, without using the global interconnect structure's GHs 210 and GVs 220. Local interconnect structure 310 allows short-distance interconnection of LEs, without utilizing the limited global resources, GHs 210 and GVs 220.

Figure 4:
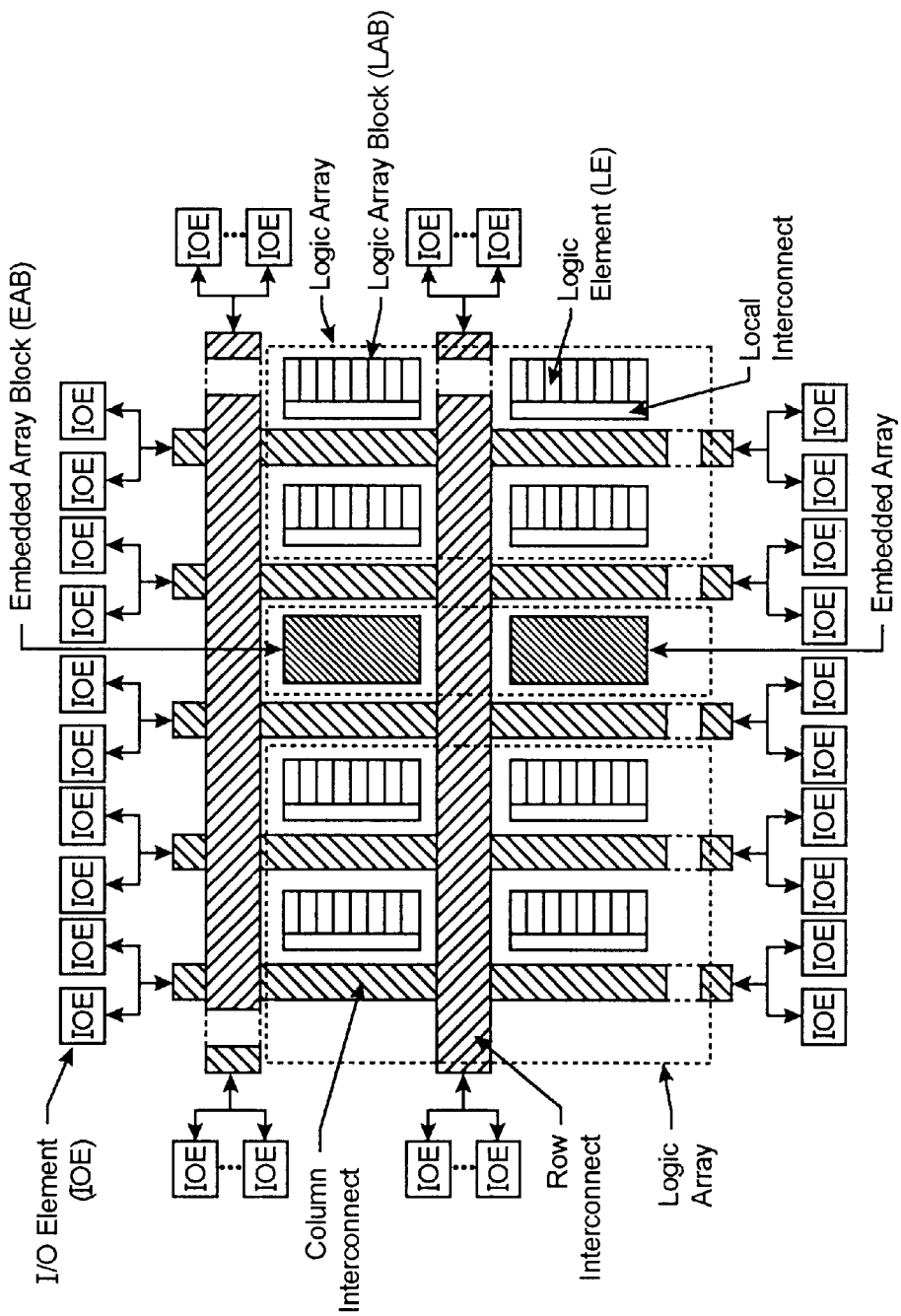
FIG. 4 shows an architecture of a programmable logic integrated circuit with embedded array blocks (EABs)
Figure 5:
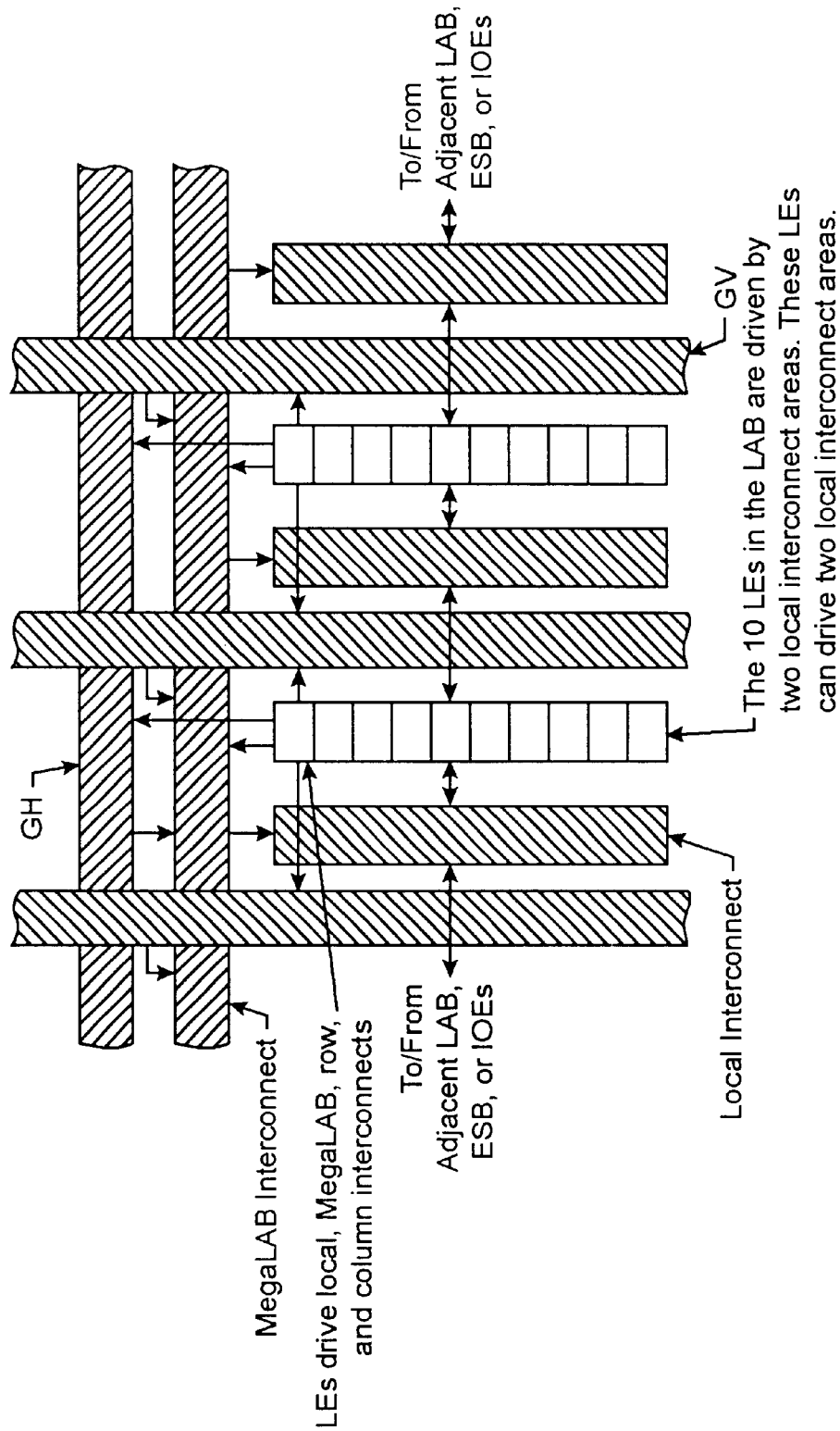
FIG. 5 shows an architecture of a programmable logic integrated circuit with megaLABs.

FIG. 4 shows a PLD architecture similar to that in FIG. 2. The architecture in FIG. 4 further includes embedded array blocks (EABs). EABs contain user memory, a flexible block of RAM. FIG. 5 shows a further embodiment of a programmable logic integrated circuit architecture. FIG. 5 only shows a portion of the architecture. The features shown in FIG. 5 are repeated horizontally and vertically as needed to create a PLD of any desired size. In this architecture, a number of LABs are grouped together into a megaLAB. In a specific embodiment, a megaLAB has sixteen LABs, each of which has ten LEs. There can be any number of mega-LABs per PLD. A megaLAB is programmably connected using a megaLAB interconnect. This megaLAB interconnect may be considered another interconnect level that is between the global interconnect and local interconnect levels. The megaLAB interconnect can be programmably connected to GVs, GHs, and the local interconnect of each LAB of the megaLAB. Compared to the architecture of FIG. 2, this architecture has an additional level of interconnect, the megaLAB interconnect. In a specific implementation, a megaLAB also includes an embedded system block (ESB) to implement a variety of memory functions such as CAM, RAM, dual-port RAM, ROM, and FIFO functions.

Figure 6:
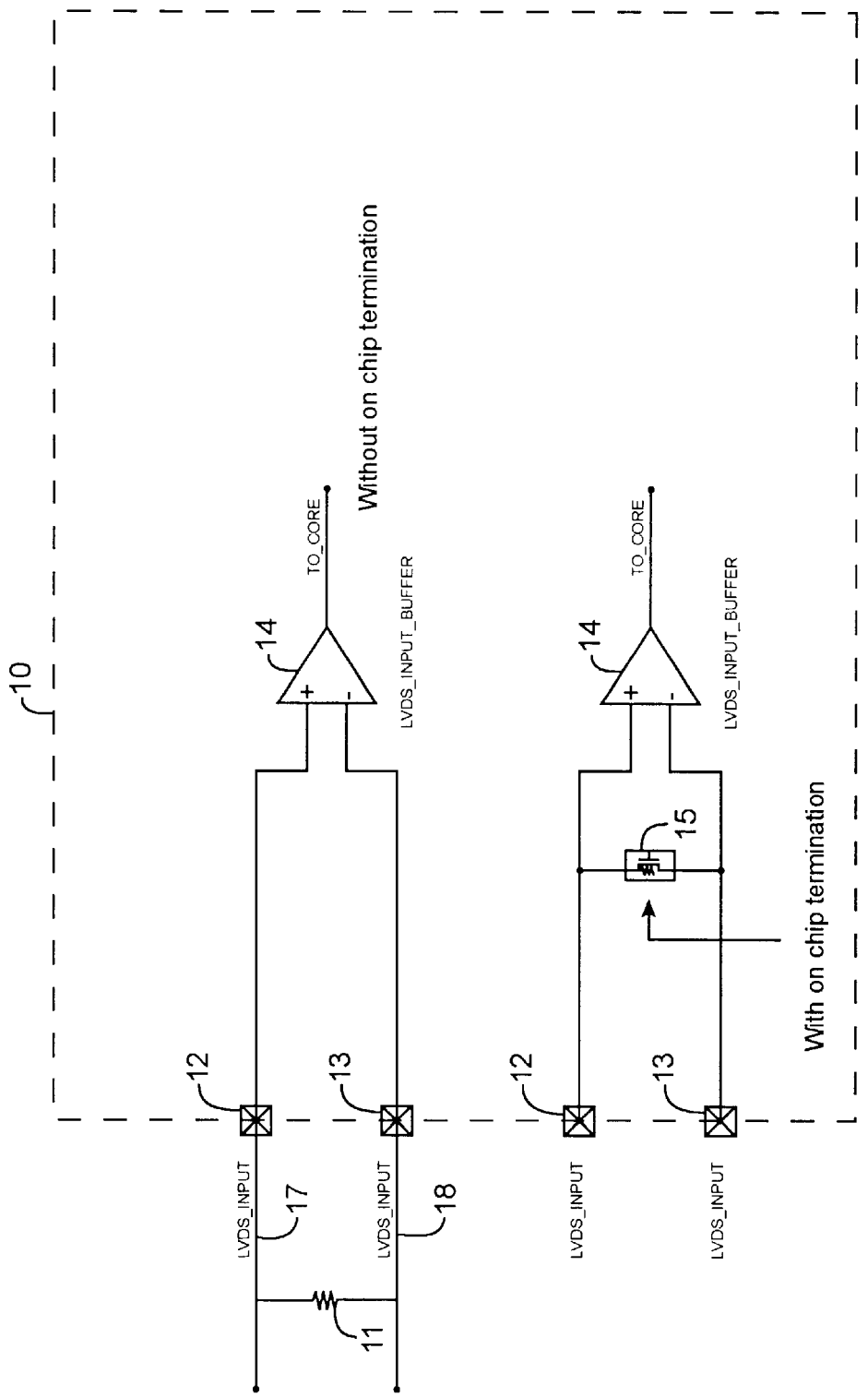
FIG. 6 is an illustration of on-chip impedance termination techniques.

FIG. 6 illustrates two techniques for providing impedance termination to differential I/O pins of an integrated circuit. Integrated circuit 10 shown in FIG. 6 includes LVDS I/O pins 12 and 13 and input buffer circuit 14. Integrated circuit 10 may be, for example, a programmable logic device, an application specific integrated circuit (ASIC), a memory circuit, or a microprocessor. Input buffer 14 drives a differential input signal applied across I/O pins 12 and 13 into core circuitry within the integrated circuit.

A prior art technique for providing impedance termination involves coupling an external, off-chip resistor 11 between differential LVDS I/O pins 12 and 13. A separate external, off-chip resistor is typically coupled between each of pair of differential I/O pins to provide impedance termination using the prior art technique. Thus, this prior art technique requires a substantial amount of board space for numerous off-chip impedance termination resistors.

Off-chip resistor 11 can be replaced with on-chip impedance termination circuit 15 of the present invention as shown in FIG. 6. Impedance termination circuit 15 is coupled between the input terminals of input buffer circuit 14. Impedance termination circuit 15 may be, for example, a transistor. On-chip control circuitry controls the impedance of on-chip impedance termination circuit 15 and other on-chip impedance termination circuits on integrated circuit 10. On-chip impedance termination circuits of the present invention may used to provide impedance termination for any differential I/O pins on a integrated circuit, such as LVDS I/O pins.

Figure 7:
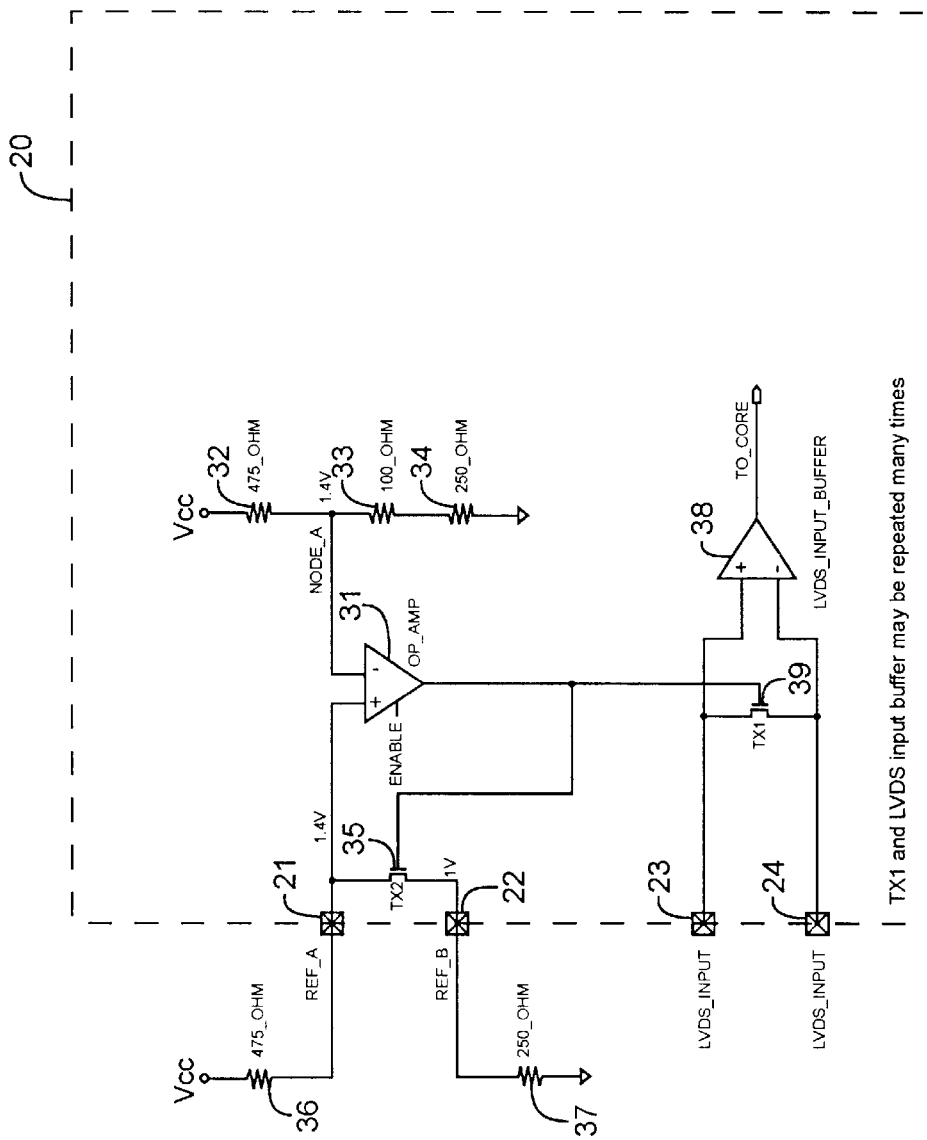
FIG. 7 is a schematic of a first embodiment of on-chip impedance termination techniques for differential I/O pins, in accordance with the present invention.

FIG. 7 illustrates a first embodiment of circuitry that can be used to control the impedance of an on-chip impedance termination circuitry, in accordance with the present invention. Integrated circuit 20 includes operational amplifier 31, transistors 35 and 39, input buffer circuit 38, I/O pins 21–24, and resistors 32–34. Transistors 35 and 39 may be, for example, field-effect transistors (FETs) such as p-channel or n-channel FETs. N-channel FETs are shown in FIG. 7 for purposes of illustration. In a further embodiment, FETs 35 and 39 may be replaced with bipolar junction transistors. Integrated circuit 20 may be, for example, a programmable logic device, an application specific integrated circuit (ASIC), a memory circuit, or a microprocessor.

External, off-chip resistor 36 is coupled between supply voltage $V_{CC}$ and I/O pin 21. External, off-chip resistor 37 is coupled between I/O pin 22 and ground. On-chip resistors 32–34 are coupled in series between supply voltage $V_{CC}$ and ground. The inverting input terminal of amplifier 31 is coupled between on-chip resistors 32 and 33 at node A. Resistors 32–34 comprise a resistor divider that sets a reference voltage at the inverting input of amplifier 31.

The non-inverting input terminal of amplifier 31 is coupled to pin 21 and the drain of transistor 35. Transistor 35 is coupled between I/O pins 21 and 22, and transistor 39 is coupled between I/O pins 23 and 24. The output terminal of amplifier 31 is coupled to the gates of transistors 35 and 39. The drain-source ($R_{DS}$) resistance of transistors 35 and 39 is determined in part by the voltage at their gate terminals. Therefore, amplifier 31 controls the resistance ($R_{DS}$) between the drain and the source of each of transistors 35 and 39. Transistors 35 and 39 may, for example, be operated in their linear regions.

Amplifier 31 is a high gain amplifier. Transistor 35 comprises a feedback loop circuit coupled between the output and the non-inverting input of amplifier 31. Amplifier 31 drives the voltage at its output terminal until the voltages at its inverting and non-inverting inputs are balanced (i.e., equal or substantially equal), using the feedback loop circuit.

If the resistance of resistor 36 equals the resistance of resistor 32 and the resistance of resistor 37 equals the resistance of resistor 34, then amplifier 31 drives the gate voltage of transistor 35 until its $R_{DS}$ resistance equals the resistance of resistor 33. When $R_{DS}$ of transistor 35 equals the resistance of resistor 33, the voltages at the inverting and non-inverting inputs of amplifier 31 are equal, because the resistance ratios are matched.

The example values shown in FIG. 7 are illustrative. Example resistance values include 475 ohms for resistors 36 and 32, 250 ohms for resistors 37 and 34, and 100 ohms for resistor 33. $V_{CC}$ may be, for example, 3.3 volts. In this case, the voltage at the inverting input of amplifier 31 is 1.4 volts.

Amplifier 31 drives the gate voltage of transistor 35 so that its $R_{DS}$ equals 100 ohms. The voltage at pin 21 and the non-inverting input of amplifier 31 equals 1.4 volts, because the resistor 33 equals the $R_{DS}$ of transistor 35. The resistor divider formed by resistors 32–34 matches the resistor divider formed by resistors 36–37 and transistor 35.

The voltage at the gate of transistor 39 equals the voltage at the gate of transistor 35. Also, transistors 35 and 39 have equal channel width-to-length (W/L) ratios. Thus, the $R_{DS}$ of transistor 35 equals the $R_{DS}$ of transistor 39, if the drain-source voltages of transistors 35 and 39 are equal. Using the example voltages and resistance values shown in FIG. 7, the drain-source voltage drop across transistor 35 is 400 millivolts, with 1 volt at pin 22. In this case, if 400 millivolts is applied across pins 23 and 24, which are coupled to the drain and source of transistor 39, the $R_{DS}$ resistance of transistor 39 is also 100 ohms.

The voltage across pins 23 and 24 varies as data is inputted into integrated circuit 20. The varying AC differential voltage across pins 23 and 24 represents data in the input signal which is interpreted by input buffer 38 as logic signals. Typically, the AC voltage swing across pins 23–24 is small compared to the DC voltage at these pins. For example, the DC voltage may be 1.2 volts, and the AC voltage swing may be, for example, have an amplitude of 400 mV.

If the drain-source voltage across transistor 39 differs from the drain-source voltage across transistor 35 due to the voltage swing across pins 23–24, then the $R_{DS}$ resistance of these two transistors may also differ. However, as long as the voltage swing across pins 23–24 is relatively small (e.g., 400 mV), then the $R_{DS}$ resistance of transistors 35 and 39 is substantially equal.

The $R_{DS}$ of transistor 39 provides impedance termination for the input signal that is applied across pins 23 and 24, without the need for an external, off-chip resistor. Buffer circuit 38 may be, for example, an amplifier or a comparator circuit as shown in FIG. 7. Buffer 38 amplifies or buffers the input signal applied across pins 23 and 24 and drives the input signal into core circuitry within integrated circuit 20.

Amplifier 31, therefore, sets the impedance termination for pins 23 and 24 by controlling the $R_{DS}$ of transistor 39. Amplifier 31 may also drive other impedance termination transistors that are coupled across other pairs of differential I/O pins. For example, amplifier 31 may drive hundreds of impedance termination transistors. Thus, the circuitry of the present invention substantially reduces the number of off-chip, external resistors that are needed to provide impedance termination to numerous pair of differential I/O pins on an integrated circuit.

The amount of board space required in the present invention is substantially reduced relative to the prior art. Only external resistors 36 and 37 are needed to provide impedance termination to numerous of pairs of differential I/O pins on an integrated circuit. The impedance termination for each of the pairs of differential I/O pins is actually provided by transistor 39 and other identical transistors. Transistor 39 also provides current between pins 23–24 that varies with the input voltage swing.

Variations in the temperature, voltage, and process fabrication techniques in integrated circuit 20 can cause the resistance of resistors 32–34 to vary from their ideal values. For example, if the temperature of integrated circuit 20 increases, the resistance of resistors 32–34 may also increase. As another example, if the supply voltage of integrated circuit 20 changes, the resistance of resistors 32–34 may also change.

In any event, temperature, voltage, and process variations in integrated circuit 20 cause the resistance of on-chip resistors 32–34 to track each other. Changes in process, temperature, or voltage in circuit 20 generally cause the resistance of resistors 32–34 to increase or decrease proportionally with each other, so that resistors 32–34 maintain the same resistance ratio. Therefore, variations in temperature, process, and voltage in integrated circuit 20 generally do not cause the voltage at node A to change significantly.

This is advantageous, because the impedance termination circuitry shown in FIG. 7 is generally not sensitive to variations in temperature, voltage, and process fabrication techniques. Changes in the resistance of resistors 32–34 caused by temperature, process, and voltage variations does not cause the $R_{DS}$ resistance of transistor 39 and other impedance termination transistors in circuit 20 to change.

Transistor 35 is also not sensitive to process, voltage, and temperature variations in circuit 20, because amplifier 31 controls the $R_{DS}$ of transistor 35 so that the voltages at the inputs of amplifier 31 are balanced. Resistors 36–37 are preferably precision resistors and their resistance is generally not affected by temperature, process and voltage variations in integrated circuit 20.

The impedance termination circuitry shown in FIG. 7 is also advantageous, because it reduces the reflection of input signals on signal lines coupled to I/O pins 23 and 24. In prior art techniques, impedance termination resistor 11 is located off-chip and is coupled between transmission lines 17 and 18 (FIG. 6) that provide the differential input signal. Resistor II is also coupled to pins 12 and 13 through transmission lines 17–18.

Transmission lines 17 and 18 have a characteristic resistance. Resistor 11 eliminates reflection of signals on transmission lines 17–18 to the left of resistor 11 in FIG. 6, by providing an impedance that is in parallel with transmission lines 17–18 and that matches the impedance on lines 17–18. However, resistor 11 does not eliminate the reflection of input signals that is caused by the characteristic resistance on transmission lines 17 and 18 to the right of resistor 11 in FIG. 6. Placing the impedance termination circuit 15 on-chip across the input terminals of the input buffer 14 (e.g., transistor 39) eliminates reflection of the input signal.

Figure 8:
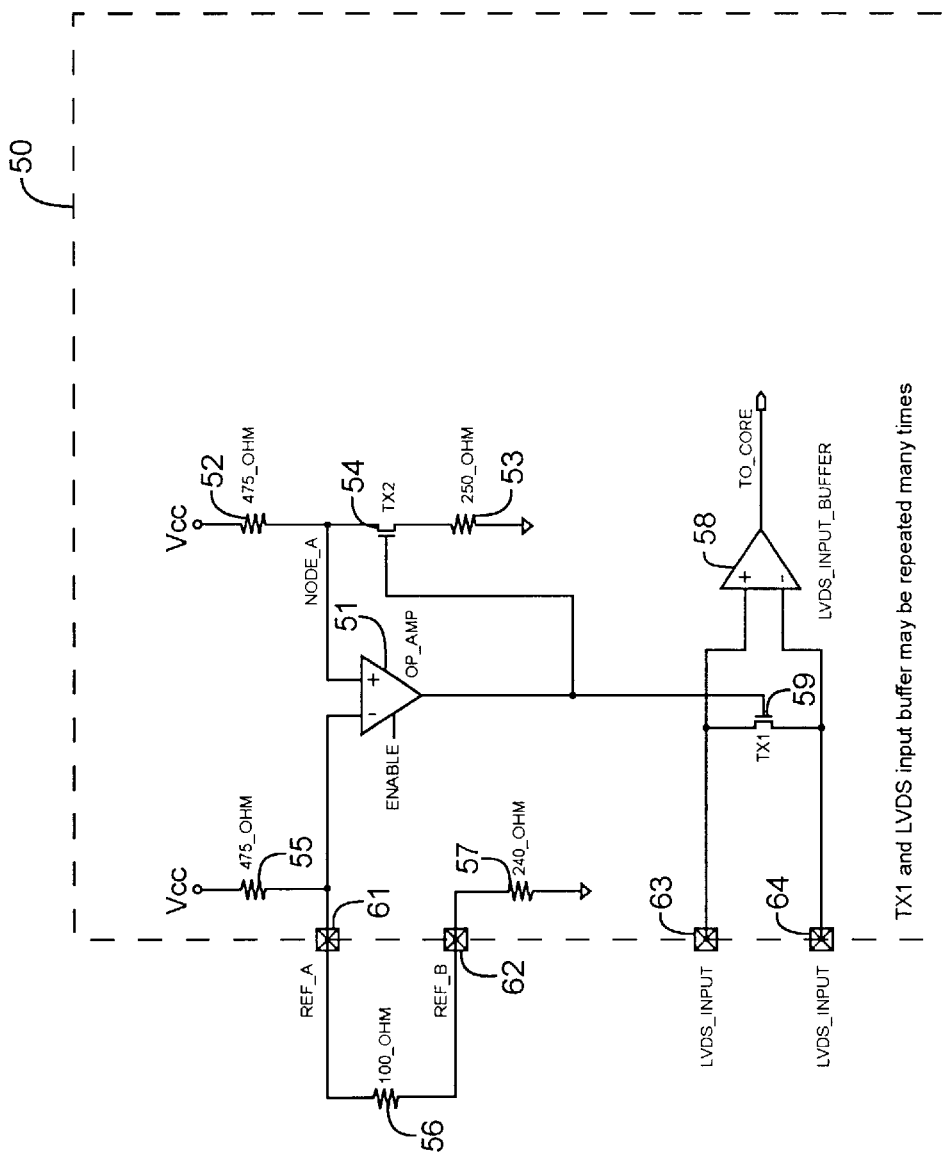
FIG. 8 is a schematic of a second embodiment of on-chip impedance termination techniques for differential I/O pins, in accordance with the present invention.

FIG. 8 illustrates a further embodiment of impedance termination circuitry of the present invention. Integrated circuit 50 includes operational amplifier 51, input buffer circuit 58, field-effect transistors 54 and 59, and on-chip resistors 52, 53, 55, and 57. Integrated circuit 50 also has I/O pins 61–64. Integrated circuit 50 may be, for example, a programmable logic device, an application specific integrated circuit (ASIC), a memory circuit, or a microprocessor.

Input buffer circuit 58 may be, for example, an amplifier or a comparator. Input buffer circuit 58 drives differential input signals received across pins 63–64 to circuitry with integrated circuit 50. In a further embodiment, FETs 54 and 59 may be replaced with bipolar junction transistors.

External resistor 56 may be coupled off chip between I/O pins 61–62 as shown in FIG. 8. Resistor 55 is coupled between supply voltage $V_{CC}$ and pin 61, and resistor 57 is coupled between pin 62 and ground. The inverting terminal of amplifier 51 is coupled to pin 61 between resistors 55 and 56. Resistors 55–57 form a resistor divider between $V_{CC}$ and ground. Resistors 55–57 provide a reference voltage to the inverting input of amplifier 51, as discussed above with respect to resistors 32–34.

Resistor 52, transistor 54, and resistor 53 are coupled in series between $V_{CC}$ and ground. Resistor 52 has the same resistance as resistor 55 (e.g., 475 ohms), and resistor 53 has the same resistance as resistor 57 (e.g., 250 ohms). The output of amplifier 51 is coupled to the gate terminals of transistors 54 and 59. Amplifier 51 is a high gain amplifier that drives its output so that the voltages at its two input terminals are substantially equal. Amplifier 51 drives the gate voltages of transistors 54 and 59 so that their $R_{DS}$ resistance equals the resistance of resistor 56, as discussed above with respect to amplifier 31. Thus, amplifier 51 drives impedance termination transistor 59 so that its $R_{DS}$ resistance equals resistor 56. Amplifier 51 may also drive numerous other impedance termination transistors, that are coupled between differential I/O pins. Amplifier 51 sets the $R_{DS}$ for each of these impedance termination transistors to be equal to the resistance of resistor 56.

The impedance termination and associated control circuitry of FIG. 8 is identical to the circuitry of FIG. 7, except that resistor 56 is off-chip while resistor 33 is on-chip, and resistors 52–53 are on-chip while resistors 36–37 are off-chip. The advantage of the circuitry of FIG. 8 is that the user of integrated circuit 50 has to add only one external, off-chip resistor, instead of two off-chip resistors. A further advantage of integrated circuit 50 is that the $R_{DS}$ resistance of impedance termination transistor 59 (and other impedance termination transistors on integrated circuit 50) are set to be equal to the resistance of user-added resistor 56. Therefore, integrated circuit 50 provides the user with the added convenience of knowing that resistor 56 is indicative of the impedance termination provided to differential I/O pins on the integrated circuit.

A disadvantage of circuit 50 is that it is more sensitive to temperature, process, and voltage variations than integrated circuit 20. First, the $R_{DS}$ resistance of transistor 54 does not track variations in the resistance of resistors 52–53 caused by changes in temperature, voltage, and processes. Therefore, the voltage at node A (at the non-inverting input of amplifier 51) may change in response to temperature, voltage, and process variations.

Also, the resistance of resistor 56 does not track variations in the resistance of resistors 55 and 57 caused by changes in temperature, voltage, and process on integrated circuit 50, because resistor 56 is located off-chip. Therefore, the voltage at pin 61 may change in response to temperature, voltage, and process variations. Voltage changes at the inverting and/or non-inverting inputs of amplifier 51 may cause the $R_{DS}$ resistance of transistor 59 to change so that it does not match the resistance of resistor 56. In any event, changes in the $R_{DS}$ resistance of transistor 59 are typically small for most expected variations in temperature, voltage and processes within integrated circuit 50.

In another embodiment of the present invention, a subset of or all of resistors 55–57, 52, and 53 may be off-chip resistors. In another embodiment, all of resistors 55–57, and 52–53 may be on-chip resistors. In still another embodiment, the feedback loop circuit and/or the amplifier 51/31 may be off-chip circuit elements external to the integrated circuit.

In a further embodiment of the present invention, an impedance termination transistor can be coupled between differential output pins of an integrated circuit. The resistance of the impedance termination transistor is controlled by control circuitry disclosed above.

While the present invention has been described herein with reference to particular embodiments thereof, a latitude of modification, various changes and substitutions are intended in the foregoing disclosure, and it will be appreciated that in some instances some features of the invention will be employed without a corresponding use of other features without departing from the scope of the invention as set forth. Therefore, many modifications may be made to adapt a particular situation or material to the teachings of the invention without departing from the essential scope and spirit of the present invention. It is intended that the invention not be limited to the particular embodiment disclosed as the best mode contemplated for carrying out this invention, but that the invention will include all embodiments and equivalents falling within the scope of the claims.

What is claimed is:

1. An integrated circuit comprising:
   an amplifier circuit;
   feedback loop circuit coupled between an output and a fist input of the amplifier circuit;
   an impedance termination circuit coupled between first and second pins of the integrated circuit and to the output of the amplifier circuit; and
   a resistor divider coupled to a second input of the amplifier circuit, wherein the resistor divider comprises third and fourth pins, and an off-chip resistor is coupled to the third and fourth pins to complete the resistor divider.

2. The integrated circuit of claim 1 fixer comprising,
   a second resistor coupled between the off-chip resistor and a supply voltage; and
   a third resistor coupled between the off-chip resistor and ground.

3. The integrated circuit of claim 2 wherein the feedback loop circuit includes a transistor and the integrated circuit fierier comprises:
   a four resistor coupled between the transistor and the supply voltage;
   a fifth transistor coupled between the transistor and ground; and
   a buffer circuit coupled between the first and the second pins.

4. The integrated circuit of claim 1 wherein:
   the integrated circuit is a programmable logic device.

5. The integrated circuit of claim 1 further comprising a buffer circuit coupled across the first and second pins.

6. The integrated circuit of claim 1 wherein the feedback loop circuit comprises a transistor.

7. The integrated circuit of claim 6 wherein the feedback loop circuit further comprises first and second resistors, and wherein a first terminal of the transistor is coupled to the first resistor, a second terminal of the transistor is coupled to the second transistor, and a third terminal of the transistor is coupled to the output of the amplifier circuit.

8. The integrated circuit of claim 1 wherein the impedance matching circuit comprises a transistor.

9. The integrated circuit of claim 1 wherein the amplifier circuit drives its output so that voltages at its first and second input terminals are substantially equal.

10. A method for providing impedance termination to first and second differential pins of an integrated circuit, the method comprising:
    providing a reference voltage at a first input of an amplifier by coupling a resistor divider to the first input of the amplifier, wherein providing the reference voltage further comprises coupling an off-chip resistor to third and fourth pins of the integrated circuit to complete the resistor divider,
    driving a feedback loop circuit coupled to an output of the amplifier so that a voltage at a second input of the amplifier matches the reference voltage; and
    driving an impedance matching circuit coupled between the first and the second differential pins using the amplifier.

11. The method of claim 10 wherein the integrated circuit is a programmable logic device.

12. The method of claim 10 wherein driving the feedback loop circuit coupled to the output of the amplifier further comprises driving a transistor having a first terminal coupled to a second resistor, a second terminal coupled to a third resistor, and a third terminal coupled to the output of the amplifier.

13. The method of claim 10 further comprising buffering signals received at the differential input pins using a buffer circuit.

14. The method of claim 10 wherein the impedance matching circuit comprise a transistor.

15. The method of claim 10 driving the feedback loop circuit coupled to the output of the amplifier further comprises driving a transistor coupled between the output of the amplifier and the second input of the amplifier.

16. An integrated circuit comprising:
    an amplifier circuit;
    a first transistor coupled between an output and a first input of the amplifier circuit;
    a resistor divider circuit coupled to a second input of the amplifier circuit; and
    a second transistor coupled between a pair of differntial pins and to the output of the amplifier circuit,
    wherein the drain-source resistance of the first transistor is substantially equal to the drain-source resistance of the second transistor.

17. The integrated circuit of claim 16 further comprising a first resistor coupled to a first terminal of the first transistor, and a second resistor coupled to a second terminal of the first transistor.

18. The integrated circuit of claim 16 wherein the resistor divider circuit comprises three resistors coupled in series.

19. The integrated circuit of claim 16 wherein the integrated circuit is a programmable logic device.

20. An integrated circuit comprising:
    an amplifier circuit;
    a first transistor coupled between an output and a first input of the amplifier circuit, wherein the first transistor is coupled between first and second input/output pins of the integrated circuit;
    an impedance termination circuit comprising a second transistor coupled between third and fourth input/output pins of the integrated circuit and to the output of the amplifier circuit;
    a buffer circuit having input tenninak coupled to the third and the fourth pins;
    a first off p resistor coupled to the first pin of the integrated circuit;
    a second off-chip resistor coupled to the second pin of the integrated circuit; and
    a resistor divider coupled to a second input of the amplifier circuit.

21. The integrated circuit of claim 20 wherein the integrated circuit is a programmable logic device.

* * * * *